(12) United States Patent
Seo

(10) Patent No.: US 12,549,910 B2
(45) Date of Patent: Feb. 10, 2026

(54) VERTICAL DRILLING GUIDE AND FLATNESS MEASURING DEVICE FOR BONE CONDUCTION IMPLANT

(71) Applicant: UNIVERSITY INDUSTRY FOUNDATION, YONSEI UNIVERSITY WONJU CAMPUS, Wonju-si (KR)

(72) Inventor: Young Joon Seo, Wonju-si (KR)

(73) Assignee: UNIVERSITY INDUSTRY FOUNDATION, YONSEI UNIVERSITY WONJU CAMPUS, Wonju-si (KR)

(*) Notice: Subject to any disclaimer, the term of this patent is extended or adjusted under 35 U.S.C. 154(b) by 1020 days.

(21) Appl. No.: 17/639,152

(22) PCT Filed: Jul. 1, 2020

(86) PCT No.: PCT/KR2020/008558
§ 371 (c)(1),
(2) Date: Feb. 28, 2022

(87) PCT Pub. No.: WO2021/261643
PCT Pub. Date: Dec. 30, 2021

(65) Prior Publication Data
US 2022/0295201 A1 Sep. 15, 2022

(30) Foreign Application Priority Data
Jun. 26, 2020 (KR) .................. 10-2020-0078517

(51) Int. Cl.
*H04R 25/00* (2006.01)
*A61B 17/16* (2006.01)
(Continued)

(52) U.S. Cl.
CPC ....... *H04R 25/606* (2013.01); *A61B 17/1679* (2013.01); *A61B 17/1771* (2016.11);
(Continued)

(58) Field of Classification Search
CPC .................... H04R 2460/13; H04R 25/606
See application file for complete search history.

(56) References Cited

U.S. PATENT DOCUMENTS

| 2009/0017418 A1 | 1/2009 | Gittelson |
| 2015/0164518 A1* | 6/2015 | Jinton .................. A61B 17/685 606/86 R |
| 2018/0185114 A1* | 7/2018 | D'Hondt ................ A61B 17/56 |

FOREIGN PATENT DOCUMENTS

| KR | 10-2015-0020835 A | 2/2015 |
| KR | 20-0476682 Y1 | 3/2015 |

(Continued)

OTHER PUBLICATIONS

International Search Report dated Mar. 24, 2021 for International Application No. PCT/KR2020/008558, 4 pages with English translation.

*Primary Examiner* — Thaddeus B Cox
(74) *Attorney, Agent, or Firm* — MH2 Technology Law Group, LLP

(57) ABSTRACT

The present disclosure relates to a device that can guide perpendicular drilling and simultaneously measure flatness of an insertion surface through a locking protrusion by rotating the device in bone conduction implantation. According to the present disclosure, it is possible to measure flatness and guide perpendicular boring with a constant force even without using a separate flatness measurer in surgery. Further, it is also possible to guide drilling using a spacer having a smaller diameter by using an assistant guide member.

19 Claims, 6 Drawing Sheets

(51) Int. Cl.
*A61B 17/17* (2006.01)
*A61B 90/00* (2016.01)
*A61B 17/00* (2006.01)

(52) U.S. Cl.
CPC .... *A61B 90/06* (2016.02); *A61B 2017/00862* (2013.01); *A61B 2017/00907* (2013.01)

(56) References Cited

FOREIGN PATENT DOCUMENTS

KR   10-2016-0071279 A   6/2016
WO       2015-029023 A1   3/2015

\* cited by examiner

VERTICAL DRILLING GUIDE AND FLATNESS MEASURING DEVICE FOR BONE CONDUCTION IMPLANT

CROSS-REFERENCE TO RELATED APPLICATIONS

This application is a U.S. National Stage application of PCT/KR2020/008558 filed 1 Jul. 2020, which claims priority to Korean Application No. 10-2020-0078517 filed 26 Jun. 2020, the entire disclosures of which are hereby incorporated by reference in their entireties.

TECHNICAL FIELD

The present disclosure relates to a device for guiding perpendicular drilling that is used for bone conduction implantation and measuring flatness thereof. In detail, the present disclosure can guide perpendicular drilling and measure the flatness of an implant insertion surface through a locking protrusion by rotating a device in implantation.

BACKGROUND ART

When there are symptoms such as conductive deafness, single sided deafness, mixed deafness, etc., bone conduction implantation is performed. A bone conduction implant is a medical device that transmits sound directly to the inner ear through a bone, not through the external ear and the middle ear, and a bone conduction implant system includes an implant (bone conduction implant) and an external device (speech processor).

A bone conduction implant system is operated in a principle in which a speech processor that is an external device converts a sound caught by a microphone into an electrical signal, an internal device transmits the converted electrical signal to the coil of an inner implant inserted in a hypodermic layer, an inner vibrator directly stimulates bone conduction by mechanically vibrating, and sound energy transmitted to the inner ear is converted into a nerve signal and transmitted to the auditory nerve, whereby a user can hear the sound.

Internal device implantation is performed through a step of injecting a local anesthetic into a part to be operated, a step of cutting a skin in a C-shape for insertion, a step of boring with a guide drill using a 3 mm spacer, a step of removing the spacer and drilling 4 mm deep, a step of placing an implant perpendicularly to a bone surface, a step of fixing the implant by tightening, a step of fixing a bone bed indicator to the implant, a step of measuring flatness by rotating the bone bed indicator, a step of removing soft tissues and a bone by polishing them when there is a protruding portion, a step of fixing an implant magnet to the implant, and a step of suturing the operated part.

In order for the implant magnet to appropriately vibrate, it is important to perpendicularly insert the implant fixing the implant magnet and to remove the operated part by polishing the operated part flat such that the implant magnet does not come in contact with or is not spaced too far away from the insertion portion. Since perpendicularly fixing an implant depends on the vision of an operator through a vertical probe at the upper portion of a drill, so the accuracy may be deteriorated. When a bone bed indicator is stopped by a protruding portion while it is rotated, the flatness of an insertion portion is achieved by removing the corresponding portion. However, there is a problem that it is required to repeat measuring flatness using a specific instrument for measuring flatness and then removing the protruding portion during surgery by an operator with incised external skin fixed by tweezers.

SUMMARY OF INVENTION

Technical Problem

In order to solve these problems, an objective of the present disclosure is to provide a device for guiding perpendicular drilling and measuring flatness of a bone conduction implant which can simultaneously guide perpendicular drilling and measure the flatness of an implant insertion surface through a locking protrusion by rotating a device in implantation.

Another objective of the present disclosure is to provide a device for guiding perpendicular drilling and measuring flatness of a bone conduction implant which can be used as perpendicular drilling guides of drill spacers having different diameters using an assistant guide member.

Solution to Problem

In order to achieve the objectives, a device for guiding perpendicular drilling and measuring flatness of a bone conduction implant is configured to be supported on a bore surface of a bone conduction implant, has a through-hole formed at the center perpendicular to the bore surface of the bone conduction implant, and has a circular bottom, in which a locking protrusion is formed at a portion of the outer surface of the bottom.

Further, the device is configured to include a bottom ring having a locking protrusion formed at a portion of the outer surface, a top ring having a through-hole for guiding perpendicular drilling, and connectors connecting the bottom ring and the top ring.

Advantageous Effects of Invention

According to the present disclosure, it is possible to simultaneously measure flatness and accurately guide perpendicular boring without depending on the visual field of an operator even without replacing and using a separate flatness measurer.

Further, since the device of the present disclosure is transparent, it is possible to secure a visual field for a worker and it is also possible to provide convenience such that rotation is smooth by forming a protrusion on a surface.

Further, when the bottom is transparent, as the shape of the bottom is slightly changed due to the difference between the portion being in contact with an operation portion and the portion not being in contact with the operation portion of the bottom, it is possible to visually recognize flatness through not only the locking protrusion but also the shape of the bottom.

Further, it is possible to perpendicularly guide drill spacers having different diameters using an assistant guide member.

Further, when threads according to an aspect of the present disclosure are provided, an operator can move down an electric drill or a manual driver along threads formed on a surface of a through-hole by rotating the electric drill or manually rotating the driver (a separate instrument may be used to rotate the driver) without applying a force for moving down the drill or the driver, so it is possible to guide drilling with an appropriate force.

Further, the skin which has been cut at an operation site may be required to be fixed and maintained open with tweezers during bone conduction implantation, and the bottom of the device can provide this function, so another convenience can be provided for an operator.

DESCRIPTION OF EMBODIMENTS

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Throughout the present specification, unless explicitly described otherwise, "comprising" any components will be understood to imply the inclusion of other components rather than the exclusion of any other components. Further, the terms "part", "unit", "module", "apparatus" and the like mean a unit for processing at least one function or operation and may be implemented by a combination of hardware and/or software.

It should be understood throughout the specification that the term "and/or" includes any and all combinations of one or more of the associated listed items. For example, the meaning of "a first item, a second item and/or a third item" means any and all combinations that can be presented from two or more items of the first and second and third items.

Hereinafter, an embodiment of the present disclosure will be described with reference to the accompanying drawings.

Figure 1:
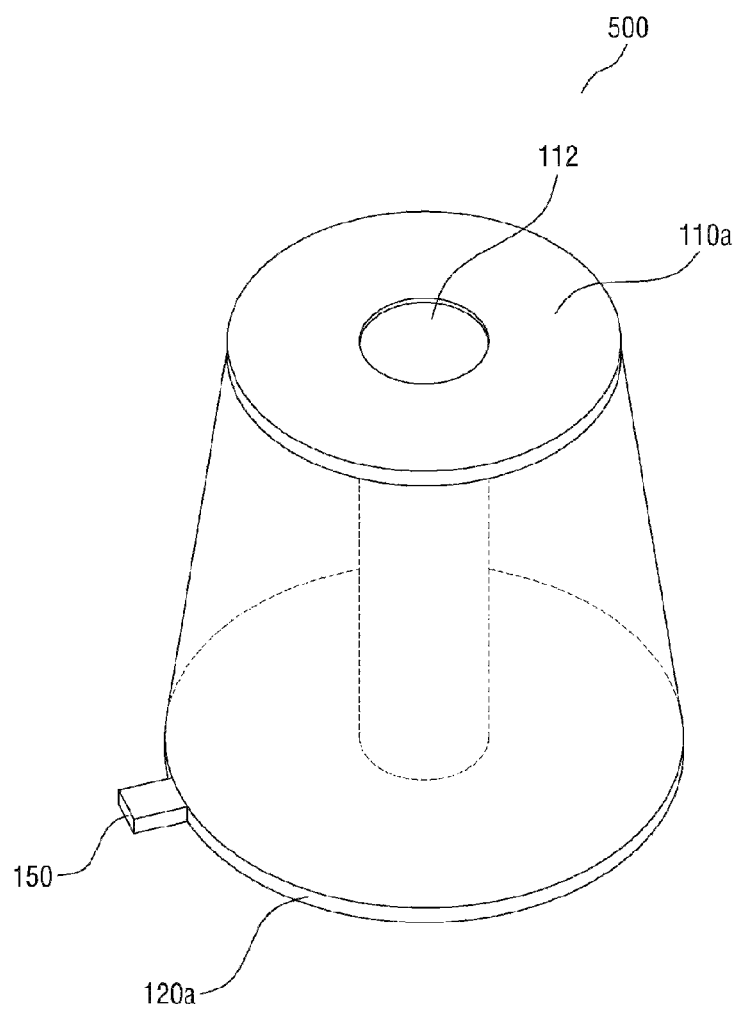
FIGS. 1 to 3 are views showing the entire configuration of a device of the present disclosure.
Figure 2:
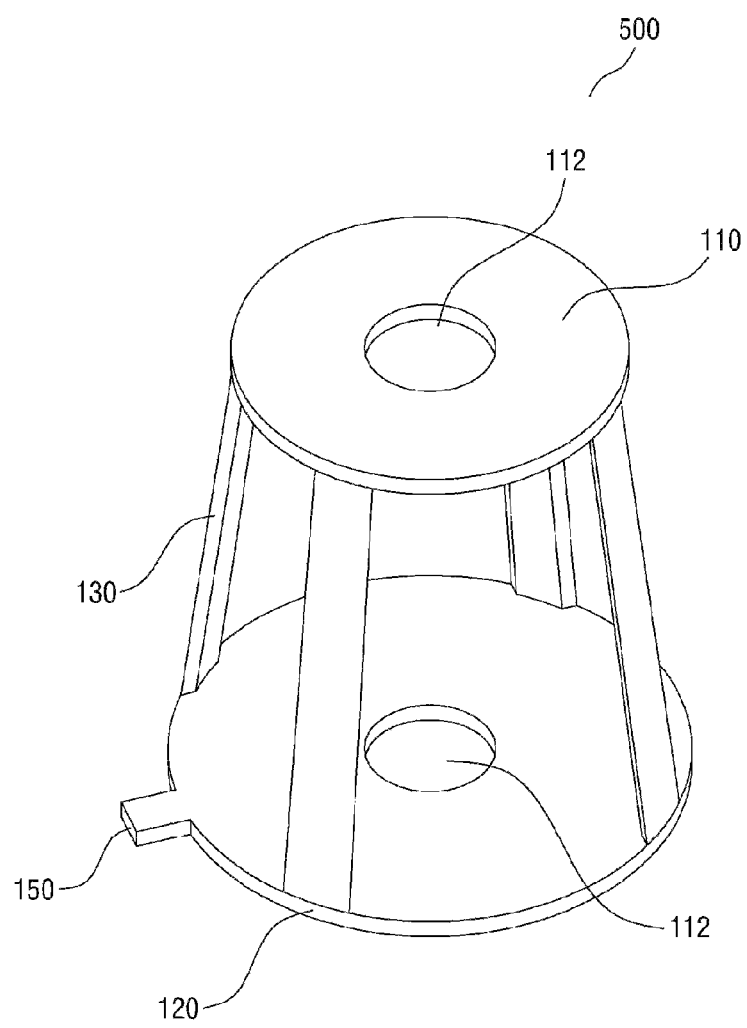
Figure 3:
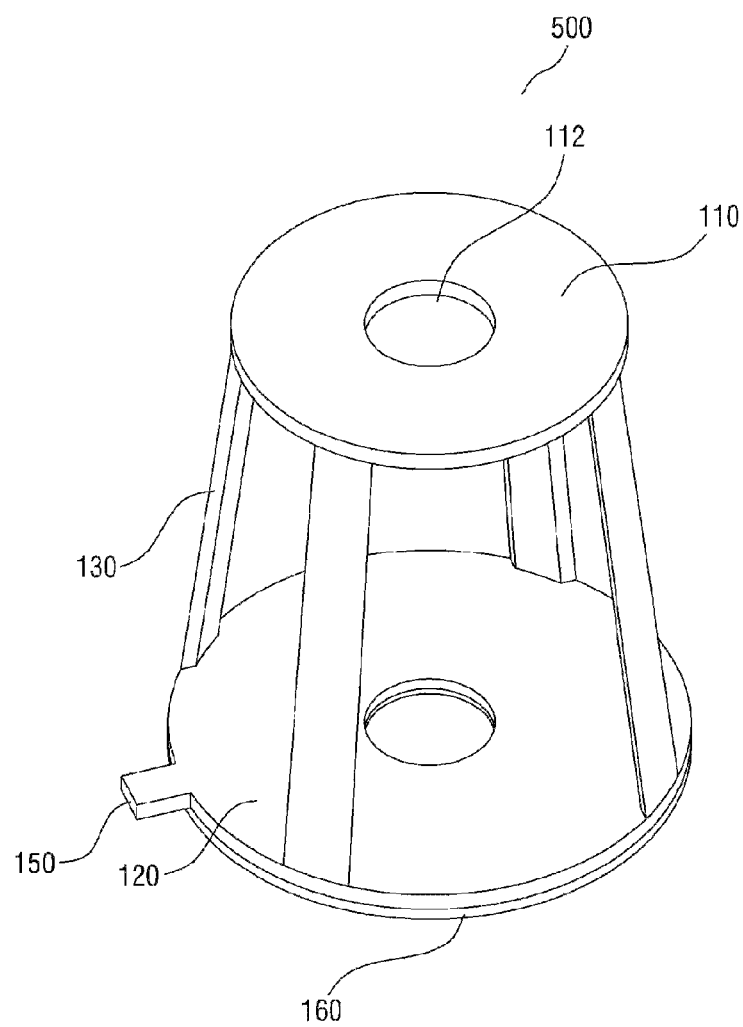

Referring to FIGS. 1 to 3 that show the entire configuration of a device of the present disclosure, as shown in the figures, a device 500 for guiding perpendicular drilling and measuring flatness of a bone conduction implant of the present disclosure is configured to be supported on a bore surface of a bone conduction implant, has a through-hole 112 formed at the center perpendicular to the bore surface of the bone conduction implant, and has a circular bottom 120, in which a locking protrusion 150 may be formed at a portion of the outer surface of the bottom 120.

In detail, the device 500 for guiding perpendicular drilling and measuring flatness of a bone conduction implant of the present disclosure may include a bottom ring 120 having a locking protrusion formed at a portion of the outer surface thereof, a top ring 110 having a through-hole for guiding perpendicular drilling, and connectors 130 connecting the top ring 110 and the bottom ring 120.

Since the through-hole 112 is formed perpendicular to the bore surface, it is possible to guide a spacer 250 of a drill to perpendicularly bore by inserting the spacer through the through-hole 112. When an operator rotates the device in close contact with an operation site to measure the flatness of a bore surface, a protruding surface, if any, is locked to the locking protrusion 150, and the corresponding portion is removed by a polisher.

The spacer 250 of a drill that is used for bone conduction implantation may be formed in various shapes. The portion having the largest diameter of the level surface of the spacer is inserted in the inner surface of the through-hole 112 and the device 500 guides perpendicular drilling.

For reference, the connectors connecting the top ring and the bottom ring are cylindrical members in FIG. 1, but are illustrated as rod shapes in FIG. 2.

According an aspect of the present disclosure, the device 500 for guiding perpendicular drilling and measuring flatness of a bone conduction implant of the present disclosure may be transparent. This is for enabling an operator to secure a visual field during surgery. When the bottom 120*a* is transparent, as the shape of the bottom 120*a* is slightly changed due to the difference between the portion being in contact with an operation site and the portion not being in contact with the operation site, an operator can visually recognize flatness through not only the locking protrusion 150, but also the shape formed at the bottom 120*a*.

The device of the present disclosure is required to be rotated in order to measure flatness. Several protrusions that can provide friction when the device is rotated may be formed at the top ring 110 to improve the convenience of operation (not shown in the figures).

The skin which has been cut at an operation site is required to be fixed and maintained open with tweezers during bone conduction implantation, and the bottom 120*a* of the device can provide this function, so another convenience can be provided for an operator.

The device 500 for guiding perpendicular drilling and measuring flatness of a bone conduction implant of the present disclosure may be formed in a shape of which the top is narrow and the bottom is wide. When the area of the top 110*a* is smaller, an operator can more easily hold the device by hand, which helps the operator secure a visual field.

That is, the bottom ring 120 is formed larger in size than the top ring 110 by increasing the diameter. As the top ring is relatively small in area, the device can be easily held by hand.

In the device for guiding perpendicular drilling and measuring flatness of an implant of the present disclosure, a circular elastic member 160 with an open center may be additionally provided at the bottom 120*a*. The elastic member may be made of rubber, silicone, etc., but is not limited thereto. The reason of providing the elastic member is for preventing damage to an operation site when the device comes in contact with the operation site, when the device is rotated, and when a bore is formed.

Hereinafter, another embodiment of the present disclosure will be described with reference to the accompanying drawings.

The device for guiding perpendicular drilling and measuring flatness of a bone conduction implant of the present disclosure may further include a cylindrical assistant guide member 115 that is inserted into the through-hole 112 and has a through-hole at the center.

Figure 4:
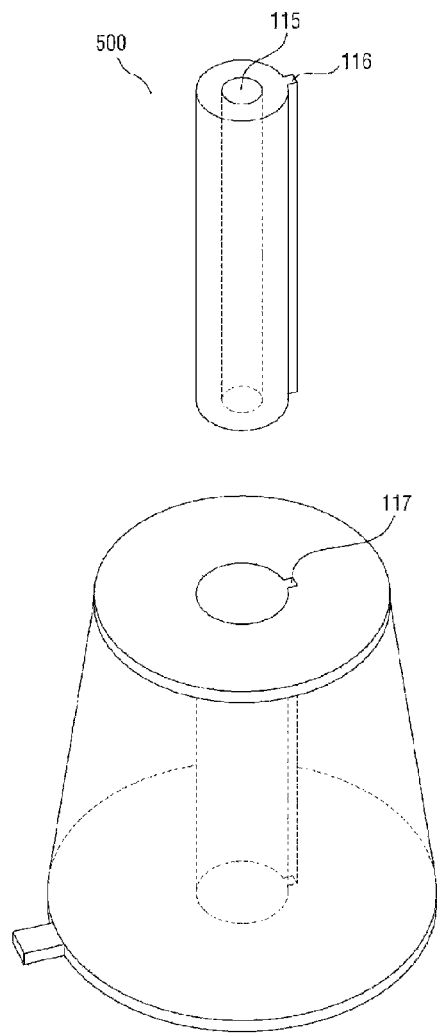
FIGS. 4 and 5 are views showing the state in which an assistant guide member is inserted or being inserted in the device of the present disclosure.
Figure 5:
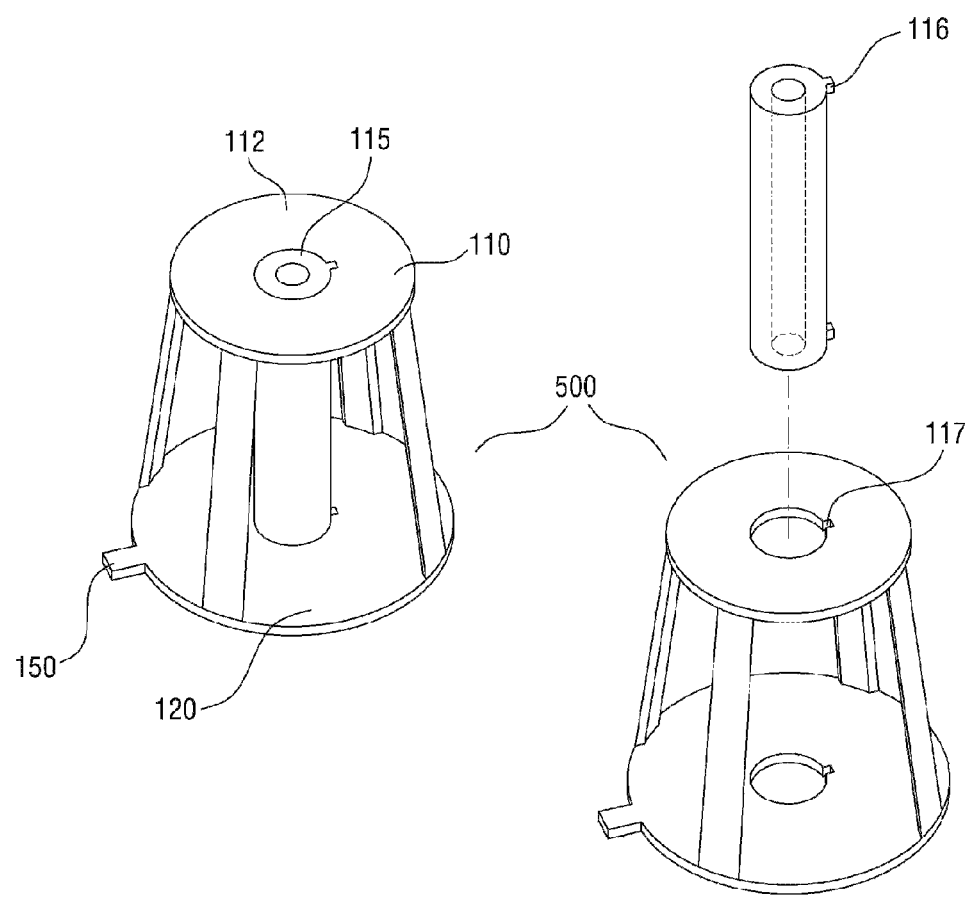

Referring to FIGS. 4 and 5 that show the state in which the assistant guide member is inserted or being inserted in the device of the present disclosure, the assistant guide member 115 is inserted and used in the through-hole 112 of the device 500 for guiding perpendicular drilling and measuring flatness of a bone conduction implant when guiding the drill spacer 250 having a smaller diameter, whereby it is used to reduce the diameter of the through-hole 112. In order to prevent rotation of the assistant guide member 115 in the through-hole 112 when the assistant guide member 115 is inserted in the through-hole 112 of the device 500 for guiding perpendicular drilling and measuring flatness of a bone conduction implant, a fixing protrusion 116 may be formed on the inner surface of the through-hole 112 of the device 500 for guiding perpendicular drilling and measuring flatness of a bone conduction implant and a fixing groove 117 may be formed on the outer surface of the assistant guide member 115. Alternatively, the fixing groove 117 may be formed on the inner surface of the through-hole 112 and the fixing protrusion 116 may be formed on the outer surface of the assistant guide member 115. In order to avoid repetition of excessively complicated description, only the configuration in which the fixing groove 117 is formed on the inner surface of the through-hole 112 of the device 500 for guiding perpendicular drilling and measuring flatness of a bone conduction implant and the fixing protrusion 116 is formed on the outer surface of the assistant guide member 115 is shown in the figures. The fixing protrusion 116 and the fixing groove 117 are fitted to each other, thereby preventing rotation of the assistant guide member 115 when the spacer 250 of the drill is rotated for drilling.

Hereinafter, another embodiment of the present disclosure will be described with reference to the accompanying drawings.

According to another aspect of the present disclosure, in the device 500 for guiding perpendicular drilling and measuring flatness of a bone conduction implant of the present disclosure, threads 200 may be formed on the inner surface of the through-hole 112 of the device for guiding perpendicular drilling and measuring flatness of a bone conduction implant.

Figure 6:
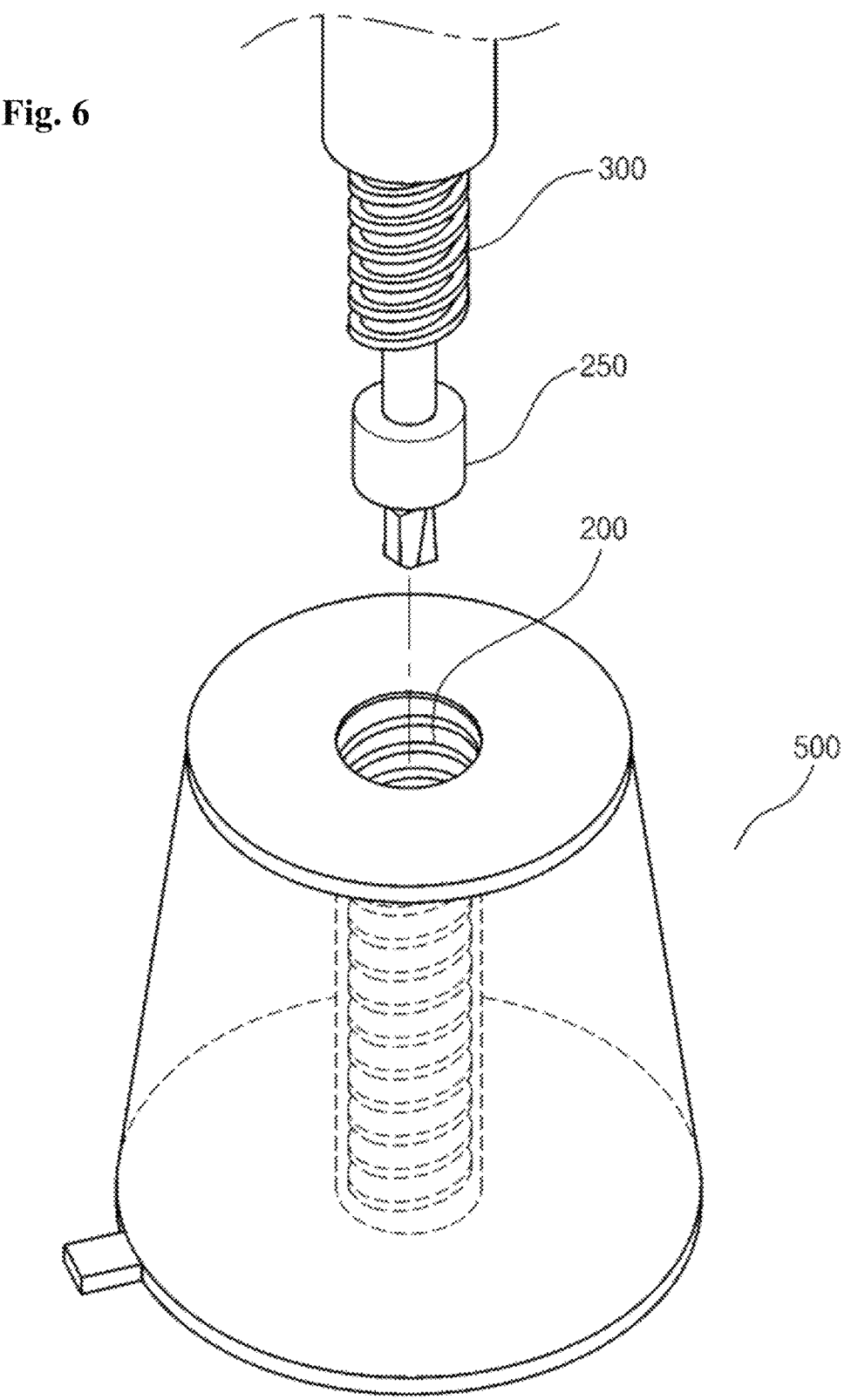
FIG. 6 is a view showing a device with threads of the present disclosure in which the cut portion at the upper end may be a manual driver or an electric drill.

Referring to FIG. 6 that is a view showing a device with threads of the present disclosure, the cut portion at the upper end may be a manual driver or an electric drill.

Threads 200 are formed on the inner surface of the through-hole 112, and threads 300 that enable downward movement to a bore surface of a bone conduction implant are formed on a manual bone conduction implant driver. Accordingly, when the driver is inserted and rotated in the through-hole 112, the driver is moved down along the threads 200 formed on the inner surface of the through-hole, so the driver is moved downward under a constant force without being influenced by the force that is applied by a user. Although it is exemplified that the threads 300 are formed at the bone conduction implant driver, the present disclosure is not limited thereto, and it may be possible to achieve the same function by preparing a manual bone conduction implant driver mount that has threads 300 and can be mounted on bone conduction implant drivers on the market and mounting the mount on an existing manual bone conduction implant driver.

Although the present disclosure was described with reference to the detailed embodiments, it is apparent to those skilled in the art that the present disclosure may be changed and modified in various ways within the scope of the present disclosure and it should be noted that the changes and modifications are included in claims.

INDUSTRIAL APPLICABILITY

The present disclosure can be used for bone conduction implantation and can be used for simultaneously measuring flatness for accurately guiding perpendicular boring without depending on the visual field of an operator even without replacing and using a separate flatness measurer.

The invention claimed is:

1. A device for guiding perpendicular drilling and measuring flatness of a bone conduction implant, wherein the device is configured to be supported on a bore surface of the bone conduction implant, has a through-hole formed at a center perpendicular to the bore surface of the bone conduction implant, and has a circular bottom,
wherein a locking protrusion is formed at a portion of an outer surface of the bottom.

2. The device of claim 1, wherein the device is transparent.

3. The device of claim 1, wherein the device has a shape of which a top is narrower than the bottom.

4. The device of claim 1, wherein a cylindrical elastic member having an open center is further provided at the bottom.

5. The device of claim 1, further comprising a cylindrical assistant guide member that is inserted in the through-hole of the device, and has another through-hole at a center of the assistant guide member.

6. The device of claim 5, wherein, in order to prevent rotation of the assistant guide member in the through-hole when the assistant guide member is inserted in the through-hole of the device, a fixing protrusion is formed on an inner surface of the through-hole of the device and a fixing groove is formed on an outer surface of the assistant guide member; or a fixing groove is formed on the inner surface of the through-hole of the device and a fixing protrusion is formed on the outer surface of the assistant guide member.

7. The device of claim 5, wherein threads are formed on an inner surface of the through-hole of the assistant guide member.

8. The device of claim 1, wherein threads are formed on an inner surface of the through-hole of the device.

9. The device of claim 8, further comprising a bone conduction implant drill having threads that enables downward movement to the bore surface along the threads formed on the inner surface of the through-hole of the device when it is inserted in the through-hole of the device, or a manual bone conduction implant drill mount having threads that can be mounted on a bone conduction implant drill for use.

10. The device of claim 8, further comprising a manual bone conduction implant driver having threads that enables downward movement to the bore surface along the threads formed on the inner surface of the through-hole of the device when it is inserted in the through-hole of the device, or a manual bone conduction implant driver mount having threads that can be mounted on a manual bone conduction implant driver for use.

11. A device for guiding perpendicular drilling and measuring flatness of a bone conduction implant, the device comprising a bottom ring having a locking protrusion formed at a portion of an outer surface, a top ring having a through-hole for guiding perpendicular drilling, and connectors connecting the bottom ring and the top ring.

12. The device of claim 11, wherein any one or more of the bottom ring, the top ring, and the connectors are transparent.

13. The device of claim 11, wherein a cylindrical elastic member having an open center is further provided at a bottom of the bottom ring.

14. The device of claim 11, further comprising a cylindrical assistant guide member that is inserted in the through-hole of the top ring and a through-hole of the bottom ring, the assistant guide member having a through-hole at a center of the assistant guide member.

15. The device of claim 14, wherein in order to prevent rotation of the assistant guide member in the through-hole of the top ring when the assistant guide member is inserted in the through-hole of the top ring, one or two fixing protrusions are formed on an inner surface of any one or more of the top ring and the bottom ring and a fixing groove is formed on an outer surface of the assistant guide member; or a fixing groove is formed on the inner surface of any one or more of the top ring and the bottom ring and one or two fixing protrusions are formed on the outer surface of the assistant guide member.

16. The device of claim 14, wherein threads are formed on an inner surface of the through-hole of the assistant guide member.

17. The device of claim 11, wherein threads are formed on an inner surface of any one of the top ring and the bottom ring of the device.

18. The device of claim 17, further comprising a bone conduction implant drill having threads that enables downward movement to a bore surface of the bone conduction implant along the threads formed on an inner surface of the through-hole of the device when it is inserted in the through-hole of the device, or a manual bone conduction implant drill mount having threads that can be mounted on a bone conduction implant drill for use.

19. The device of claim 17, further comprising a manual bone conduction implant driver having threads that enables downward movement to a bore surface of the bone conduction implant along the threads formed on the inner surface, or a manual bone conduction implant driver mount having threads that can be mounted on a manual bone conduction implant driver for use.

* * * * *